June 17, 1958  C. W. HAAS  2,839,725
PULSE RATE MEASURING SYSTEM
Filed Oct. 24, 1955
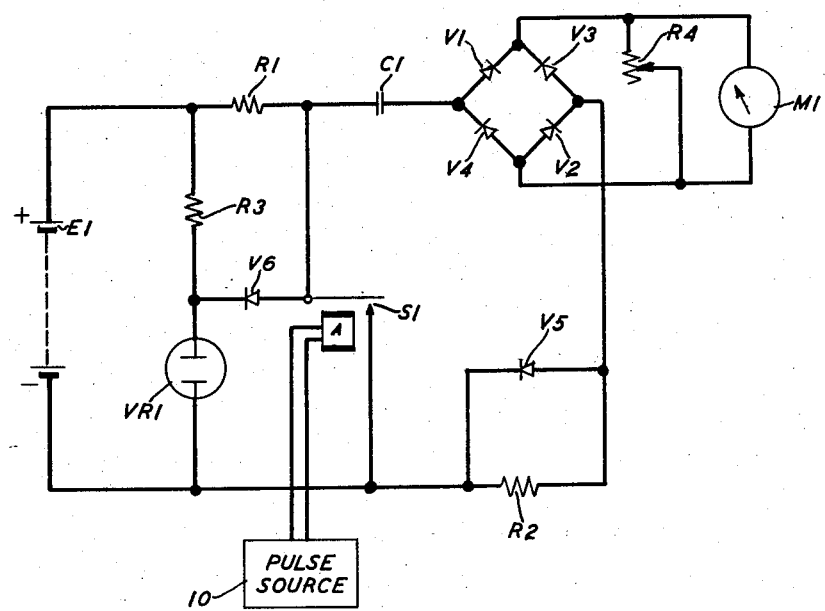
INVENTOR
C. W. HAAS
BY
ATTORNEY

2,839,725

PULSE RATE MEASURING SYSTEM

Charles W. Haas, Morris Plains, N. J., assignor to Bell Telephone Laboratories, Incorporated, New York, N. Y., a corporation of New York Application October 24, 1955, Serial No. 542,261

5 Claims. (Cl. 324—78)

This invention relates to measuring devices and, more particularly, to such devices for measuring the repetition rate of electrical pulses.

In a variety of electrical systems involving pulse signals, it is important to determine accurately and readily the repetition rate or frequency of the pulses. An illustrative example is the measurement of the pulse rate of the dial pulses in automatic telephone systems. In one known type of apparatus utilized for this purpose, a direct-current meter calibrated in pulses per second is energized in accordance with the charging or discharging of a condenser which, in turn, is responsive to or controlled in accordance with the pulse rate. Advantageously, of course, in the interest of accuracy, large meter deflections are desirable. Such deflections can be obtained through the use of a large capacitance condenser or a highly sensitive meter. However, use of a large capacitance condenser necessitates the use of a high capacity current source for charging purposes and, further, because of the time constants involved, restricts the range of pulse lengths to which the device will be accurately responsive. Further, sensitive meters are costly and are susceptible to easy damage.

One general object of this invention is to improve devices for measuring the repetition rate of pulses. More specifically, objects of this invention are to enhance the accuracy of measurement of such devices, increase the range of pulse lengths to which the devices will respond accurately, reduce the requirements for the condenser charging source, and decrease the cost of the devices.

In accordance with one feature of this invention, in a measuring device of the general type indicated, both charge and discharge currents of the condenser are utilized to effect operation of the meter whereby increased meter deflection and, concomitantly therewith increased accuracy are attained.

In accordance with another feature of this invention, means are provided for limiting the condenser charging current whereby the requirements upon the charging source are ameliorated and, further, time constants are reduced with attendant enhancement of the range of pulse lengths to which the device will be accurately responsive.

The invention and the above noted and other features thereof will be understood more clearly and fully from the following detailed description with reference to the accompanying drawing in which the single figure is a circuit diagram of a pulse repetition rate measuring device illustrative of one embodiment of this invention.

In the figure, the condenser C1 charges to the value predetermined by the voltage regulating tube VR1 and then discharges under the control of switch contacts S1 which pulse at the rate to be measured. The condenser charge and discharge currents after rectification by semiconductor diodes V1, V2, V3, and V4 pass through the frequency indicating meter M1 thereby producing a meter deflection which is proportional to the pulse rate of the contacts S1.

The switch S1 may be the contacts of a relay which is energized by the external pulse source 10 under measurement or they may be external contacts associated with a pulse generating source such as a telephone dial. These switch contacts may be either open or closed when the measuring circuit is at rest.

As will be detailed below, when the aforementioned switch contacts S1 are open the condenser C1 charges and when these switch contacts are closed the charging source for condenser C1 is short-circuited and the condenser discharges. At the instant the switch contacts open, there is zero charge on the condenser and there is a completed condenser charging path. This path comprises a direct-current source of potential E1 in series with the charging resistor R1, condenser C1, diode V1, frequency indicating meter M1 and its shunt calibrating resistor R4, diode V2, and diode V5. Diodes V1, V2, and V5 are semiconductor devices such as germanium or selenium diodes which are connected to be conductive to condenser charging currents; therefore, diode V5 short-circuits resistor R2 during the condenser charging interval. Short-circuiting resistor R2 during the charging interval makes the time constant of the charging path substantially independent of the value of resistor R2.

When the switch contacts close, the source of charging potential is short-circuited through charging resistor R1, and a discharge path for condenser C1 is completed. This path comprises the closed switch contacts S1, discharge resistor R2, diode V3, frequency indicating meter M1 in shunt with its manually variable calibrating resistor R4, diode V4, and condenser C1. Semiconductor diodes V3 and V4 are electrically the same as diodes V1 and V2 respectively, and are connected to be conductive to condenser discharge currents. Diode V5 is non-conductive for these discharge currents. Therefore, with diode V5 non-conductive the value of the parallel arrangement of resistor R2 and diode V5 is approximately equal to that of resistor R2 alone. Resistor R2 is equal in value to resistor R1, therefore assuming that semiconductor diodes V1, V2, V3, and V4 have substantially equal forward impedances, the condenser charge and discharge paths have equal time constants and the resulting current pulses in the frequency indicating meter are of equal magnitude, duration and polarity.

The voltage regulating tube VR1 in conjunction with its dropping resistor R3 and semiconductor diode V6 serves to limit the peak charging voltage applied to the condenser C1. When the charge on condenser C1 equals the reference voltage established by the regulating voltage VR1, the diode V6 will conduct and, therefore, the junction between R1 and C1 will never rise appreciably above the predetermined reference voltage. This voltage regulating arrangement allows the use of a relatively high potential condenser charging source which produces a rapid charging of condenser C1 without increasing the peak current drain of the charging source.

Measured pulses whose durations are greater than the time constant of the condenser charging path effect capacitor charging current pulses which are independent of the duration of the measured pulses. Therefore, pulses such as are used in the testing of dial telephone equipment, may be accurately measured without regard to the pulse percent break. Percent break as used herein denotes the ratio of the length of the open period of an impulse cycle to the length of the entire impulse cycle. This is important in telephone work as determination of the operating efficiency of dial telephone equipment requires variation of pulse percent break over rather wide limits.

The average meter deflection will be a function of the total number of pulses, both charge and discharge, which are supplied to the frequency indicating meter per unit of time. This invention optimizes accuracy and efficiency by utilizing both the condenser charge and discharge currents.

What is claimed is:

1. A pulse rate measuring device comprising a condenser, a full wave rectifying meter means, a charging resistor, a discharge resistor, an asymmetrical circuit element in shunt with said discharge resistor and connected to define a low impedance path for condenser charging currents, said discharge resistor being equal in resistance to said charging resistor, a charging circuit for said condenser including said charging resistor, said meter means and said asymmetrical circuit element, a discharge path for said condenser including said discharge resistor and said meter means, and means responsive to the pulses to be measured for effecting alternate charge and discharge of said condenser.

2. A pulse rate measuring device comprising a condenser, a meter, a full wave bridge rectifier unit connected between said condenser and said meter, said rectifier unit having two portions defining with said meter substantially equal impedance paths for charge and discharge currents respectively from said condenser, a charging resistor, a discharge resistor, a charging circuit for said condenser including said charging resistor, said meter and one of said portions, a discharge circuit for said condenser including said discharge resistor, said meter and the other of said portions, and means responsive to the pulses to be measured for effecting alternate charge and discharge of said condenser.

3. A pulse rate measuring device comprising a condenser, a full wave rectifying meter means, a charging resistor, a discharge resistor in shunt with an asymmetrical circuit element, said asymmetrical element connected to define a low impedance path for condenser charging currents, said discharge resistor being equal in resistance to said charging resistor, a charging circuit for said condenser including said charging resistor, said meter means and said asymmetrical circuit element, means for limiting the condenser charging voltage to a predetermined value, a discharge path for said condenser including said discharge resistor and said meter means, and means responsive to the pulses to be measured for effecting alternate charge and discharge of said condenser.

4. A pulse rate measuring device comprising a condenser, a meter, a full wave bridge rectifier unit connected between said condenser and said meter, said rectifier unit having two portions defining with said meter substantially equal impedance paths for charge and discharge currents respectively from said condenser, a charging resistor, a discharge resistor, a charging circuit for said condenser including said charging resistor, said meter and one of said portions, means for limiting the condenser charging voltage to a predetermined value, a discharge circuit for said condenser including said discharge resistor, said meter and the other of said portions, and means responsive to the pulses to be measured for effecting alternate charge and discharge of said condenser.

5. A pulse rate measuring device comprising a condenser, a meter, a full wave bridge rectifier connected between said condenser and said meter, said rectifier having two portions defining with said meter substantially equal impedance paths for charge and discharge currents respectively from said condenser, a charging resistor, a discharge resistor in shunt with an asymmetrical circuit element, said asymmetrical element connected to define a low impedance path for condenser charging currents, said discharge resistor being equal in resistance to said charging resistor, a charging circuit for said condenser including said charging resistor, said meter, one of said portions and said asymmetrical circuit element, means for limiting the condenser charging voltage to a predetermined value, a discharge path for said condenser including said discharge resistor, said meter and the other of said portions, and means responsive to the pulses to be measured for effecting alternate charge and discharge of said condenser.

References Cited in the file of this patent

UNITED STATES PATENTS 2,108,014    Jones _____ Feb. 8, 1938